A. A. STRANGE & W. ANDERSON.
PRESSURE CONTROLLED OPERATING MEANS FOR TROLLEY POLES.
APPLICATION FILED OCT. 28, 1909.
991,040.
Patented May 2, 1911.
2 SHEETS—SHEET 1.
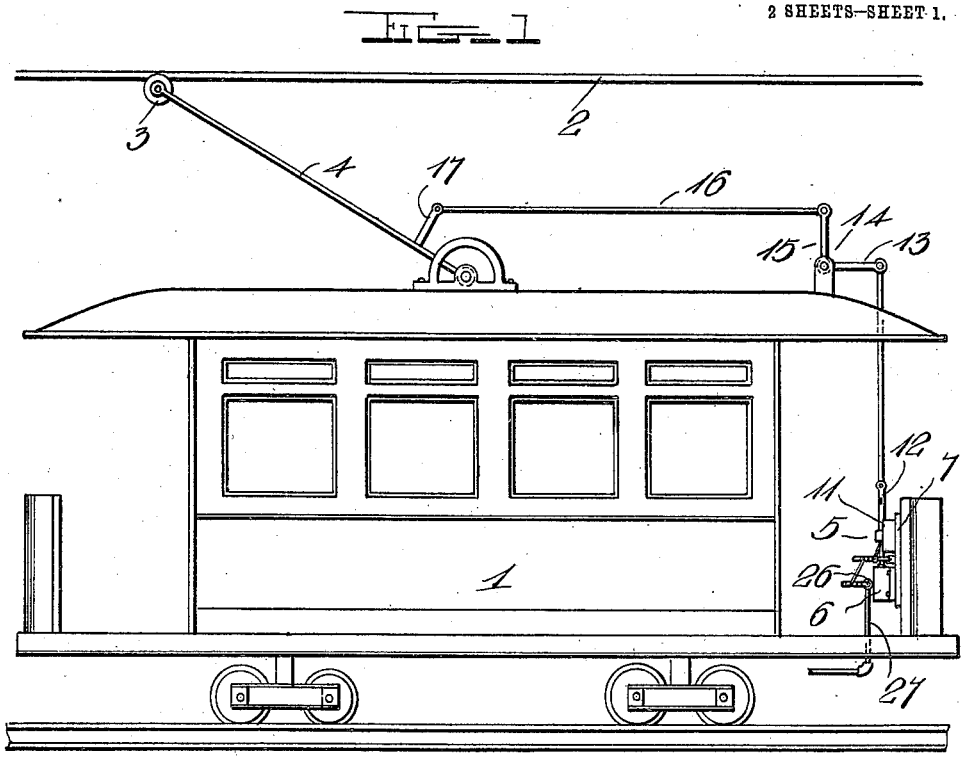
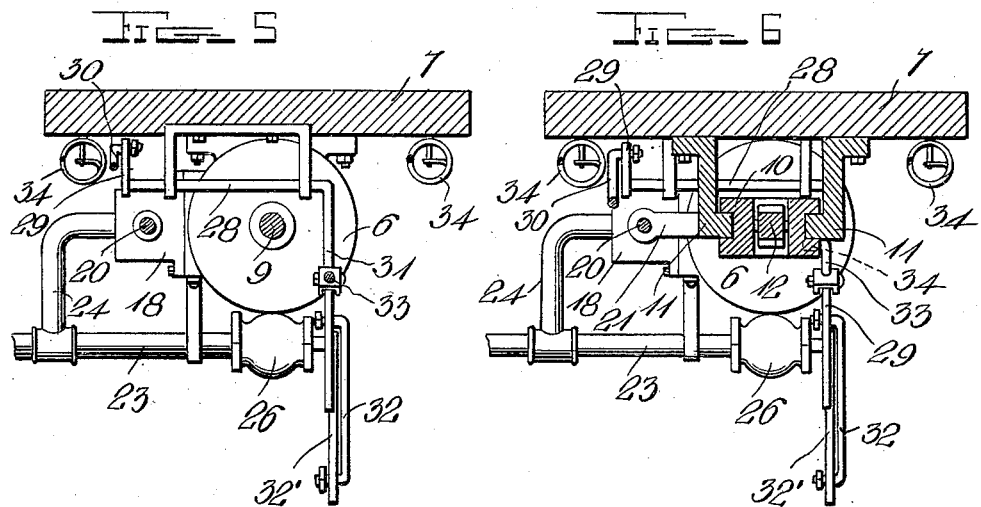
Witnesses
Inventors
A. A. Strange and W. Anderson
by their Attorneys

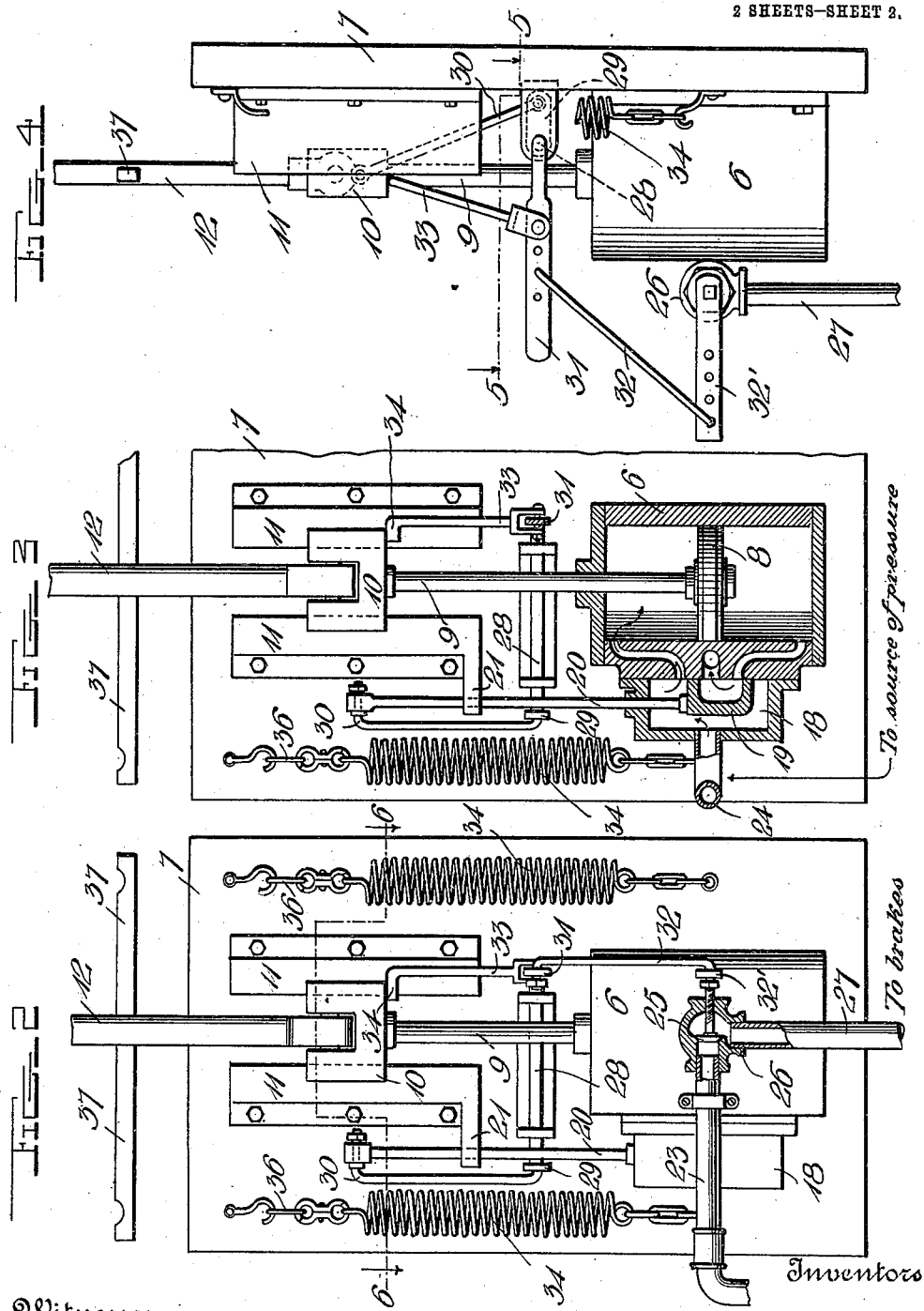

UNITED STATES PATENT OFFICE.

AYERS A. STRANGE AND WILLIAM ANDERSON, OF MEMPHIS, TENNESSEE; SAID ANDERSON ASSIGNOR OF ONE-HALF OF HIS RIGHT TO SAID STRANGE.

PRESSURE-CONTROLLED OPERATING MEANS FOR TROLLEY-POLES.

991,040.  Specification of Letters Patent.  Patented May 2, 1911.

Application filed October 28, 1909. Serial No. 525,087.

*To all whom it may concern:*

Be it known that we, AYERS A. STRANGE and WILLIAM ANDERSON, citizens of the United States, residing at Memphis, in the county of Shelby and State of Tennessee, have invented certain new and useful Improvement in Pressure-Controlled Operating Means for Trolley-Poles; and we do declare the following to be a full, clear, and exact description of the invention, such as will enable others skilled in the art to which it appertains to make and use the same.

This invention relates to pressure controlled operating means for trolley poles and has for its object to provide means of this kind whereby the trolley wheel is held in contact with the trolley wire by pressure and is permitted to fall beneath the guy and suspending wires or other parts of the overhead equipment should the trolley wheel accidentally become disengaged from the trolley wire.

With this and other objects in view, the invention consists of certain novel features of construction, combination and arrangement of parts, as will be more fully described and particularly pointed out in the appended claims.

In the accompanying drawings: Figure 1 is a diagrammatic view illustrating the application of the invention to a street railway car, the trolley pole and wheel being shown in operative position; Fig. 2 is a front elevation on an enlarged scale of the operating means for the trolley pole; Fig. 3 is a similar view showing the cylinder and controlling valve in section. Fig. 4 is a side elevation. Fig. 5 is a horizontal section taken on line 5—5 of Fig. 4; Fig. 6 is a similar view taken on line 6—6 of Fig. 2.

Referring to the drawings for a more particular description of the invention 1 indicates a street railway car, 2 the trolley wire, 3 the trolley wheel, 4 the trolley pole, and 5 the operating means for the pole. The operating means for the trolley pole comprises a cylinder 6 which is bolted or otherwise suitably mounted upon the dashboard 7 of the car. A piston 8 is arranged in the cylinder and the outer end of the piston rod 9 is provided with a cross-head 10 which is mounted to slide upon a guideway or track 11, which is also mounted upon the dashboard immediately above and in alinement with the cylinder. The cross-head 10 is connected with the lower end of the vertical operating rod 12 which in turn is connected with one arm, as 13, of a bell crank lever 14, which is pivotally mounted at the junction of its arms upon the top of the car. The other arm, as 15, of said lever is connected by the links 16 and arm 17 with the lower end of the trolley pole 4. The cylinder is provided at one side with the usual valve chest 18 in which is mounted the slide valve 19, provided with the usual stem 20 which extends upwardly through a guide bearing 21 formed by a lateral extension of the guideway or track 11. A supply pipe 23 extends across the valve chest and cylinder and is provided with a branch pipe 24 which leads to the valve chest. One end of the supply pipe leads to a pressure tank or other source of pressure fluid, while the opposite end thereof is provided with a valve 25, (see Fig. 2) to the casing 26 of which is screwed a second pipe 27 which is suitably connected with the train or brake pipe. A rock shaft 28 is mounted in suitable bearings between the cylinder and the guideway or track of the cross-head and is provided at one end with an arm 29 with which is connected, by means of the rod 30, the upper or outer end of the slide valve stem. The opposite end of the rock shaft is also provided with an outwardly extending operating arm 31, which is adjustably connected by the link or rod 32 to the arm 32′ suitably connected with the stem of the valve 25. An operating arm 33 is pivoted at its lower end to the arm 31 of the rock shaft and is provided at its free end with an inwardly extending shoulder 34 which is disposed in the path of movement of the cross-head.

In the operation of the device, the pressure fluid is supplied to the chest of the cylinder by means of the branch pipe 24 and passing into the upper end of the cylinder moves the piston down until the trolley wheel is swung into contact with the trolley wire which checks further downward movement of the piston so long as the trolley wheel is on the track. Should the trolley wheel accidentally "jump" the track the piston is instantly forced to the lower end of the cylinder. As the piston moves to the lower end of the cylinder the cross-head engages the extension 34 of the operating arm 33 and swings the arm 31 at the right hand side of the rock shaft 28 downwardly, which rocks the shaft in one direction and causes the arm 29 and rod 30 to move the slide valve stem upwardly and thus move the slide valve over the exhaust of the chest, cutting off the supply of the pressure fluid to the cylinder and permitting that which is in the cylinder to escape. During the above operation the valve 25 is opened when the pressure fluid is allowed to pass through the pipe 27 to the train pipe and apply the brakes whereby the car is instantly brought to a stop. After the supply of pressure fluid to the cylinder is cut off, as above described, the trolley pole and wheel is permitted to swing down beneath the trolley wire and the guy or suspending wires of the overhead equipment. A pair of coil springs 35 are arranged at opposite sides of the cylinder and are provided with links 36 by means of which they may be connected with opposite ends of a yoke 37 arranged at the lower end of the operating rod 12. These springs when connected with the yoke will hold the trolley wheel in contact with the trolley wire, but said springs are only used in case of an emergency or when for some reason the operating mechanism becomes inoperative.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

We claim as our invention:

1. In pressure controlled operating means for trolley poles, a cylinder, a piston movable therein having a piston rod, means for conducting a pressure fluid to the cylinder, connections between the piston rod and trolley pole to move the latter into operative position when the pressure fluid is admitted into the cylinder, means operable by the piston rod for cutting off the supply of the pressure fluid to the cylinder should the trolley pole jump the track, connections between the supply pipe for the pressure fluid and the train pipe, a valve to normally cut off the passage of the pressure fluid to the train pipe, and connections operable by the piston should the trolley wheel jump the track for opening said valve.

2. In pressure controlled operating means for trolley poles, a cylinder, a piston therein having a piston rod, a supply pipe for conducting a pressure fluid to the cylinder, a slide valve for controlling the passage of the fluid in the cylinder, connections between the trolley pole and piston rod for swinging the former into operative position when the fluid is admitted to the cylinder, a rock shaft mounted near the cylinder, an arm at one end of the rock shaft, a connection between said arm and the stem of the slide valve, and an operating arm connected with the opposite end of the rock shaft and operable by the piston rod when moved in one direction to rock the rock shaft in one direction whereby the slide valve is moved into cut off position.

3. In pressure controlled operating means for trolley poles, a cylinder, a piston therein having a piston rod, a supply pipe for conducting a pressure fluid to the cylinder, a slide valve for controlling the passage of the fluid in the cylinder, connections between the trolley pole and piston rod for swinging the former into operative position when the fluid is admitted to the cylinder, a rock shaft mounted near the cylinder, an arm at one end of the rock shaft, a connection between said arm and the stem of the slide valve, an operating arm connected with the opposite end of the rock shaft and operable by the piston rod when moved in one direction to rock the rock shaft in one direction whereby the slide valve is moved into cut off position, a discharge pipe leading from the supply pipe to the train pipe, a valve to normally close the supply pipe, and connections between said valve and the rock shaft whereby the valve is opened to permit the pressure fluid to pass to the train pipe when the rock shaft is turned in one direction.

4. In pressure controlled operating means for trolley poles, a cylinder, a piston arranged therein having a piston rod, means for supplying a pressure fluid to the cylinder to operate the piston, means for controlling the passage of the fluid into the cylinder, connections including a vertical operating rod connected with the piston and a yoke carried by said operating rod for moving the trolley pole into operative position when the pressure fluid is admitted into the cylinder, and coil springs arranged at opposite sides of the cylinder and adapted to be engaged with the ends of the yoke to exert a pull upon the vertical operating rod whereby the trolley wheel is held in contact with the trolley wire should the pressure means become inoperative.

5. In pressure controlled operating means for trolley poles, a cylinder, a piston movable therein and having a piston rod, a supply pipe for conducting a pressure fluid to the cylinder, a slide valve on the side of the cylinder for controlling the passage of the fluid into the cylinder, connections between the piston rod and trolley pole for swinging the latter into operative position when the fluid is admitted to the cylinder, and means connecting the piston rod and slide valve for moving the latter when the trolley pole swings beyond operative position, said means including a rock shaft adapted to be turned by the movement of the piston rod as the piston recedes in the cylinder.

6. In pressure controlled operating means for trolley poles, a cylinder, a piston movable therein and having a piston rod, a supply pipe for conducting a fluid pressure to the cylinder, a slide valve for controlling the passage of the fluid into the cylinder, connections between the trolley pole and piston rod for swinging the former into operative position when the fluid is admitted to the cylinder, a stem extending from said valve, an arm pivotally connected with the said valve stem, and secured at its opposite end to a rock shaft, and means for swinging said rock shaft when the trolley pole swings beyond operative position comprising an arm detachably connected with said rock shaft and provided with a shoulder arranged in the path of movement of said piston rod.

7. In pressure controlled operating means for trolley poles, a cylinder, a piston movable therein and having a piston rod, a supply pipe for conducting a fluid pressure to the cylinder, a slide valve for controlling the passage of the fluid into the cylinder, connections between the trolley pole and piston rod for swinging the former into operative position when the fluid is admitted to the cylinder, a stem extending from said valve, an arm pivotally connected with said valve stem, and secured at its opposite end to a rock shaft, means for swinging said rock shaft when the trolley pole swings beyond operative position, comprising an arm detachably connected with said rock shaft and provided with a shoulder arranged in the path of movement of said piston rod, a pipe connecting the fluid pressure supply pipe with the train pipe, a valve arranged at the junction of said pipes, and adjustable connections between the rock shaft and said last mentioned valve for opening the latter when the rock shaft is turned.

8. In pressure controlled operating means for trolley poles, a cylinder, a piston movable therein and having a piston rod, a supply pipe for conducting a pressure fluid to the cylinder, a slide valve for controlling the admission of the fluid to said cylinder, connections between the trolley pole and the piston rod for swinging the former into operative position, means connected with the slide valve for shutting off the admission of fluid to the cylinder when the trolley pole swings beyond operative position, connections between the supply pipe for the pressure fluid and the train pipe, a valve arranged to normally close the passage of the pressure fluid to the train pipe, and means operable to open said last mentioned valve when the slide valve is closed.

In testimony whereof we have hereunto set our hands in presence of two subscribing witnesses.

AYERS A. STRANGE.
WILLIAM ANDERSON.

Witnesses:
WM. C. FOULKS,
P. H. PHELAN, Jr.

Copies of this patent may be obtained for five cents each, by addressing the "Commissioner of Patents, Washington, D. C."